United States Patent
Saxe et al.

(10) Patent No.: US 8,744,866 B1
(45) Date of Patent: *Jun. 3, 2014

(54) REPUTATION REPORT WITH RECOMMENDATION

(71) Applicant: Reputation.com, Inc., Redwood City, CA (US)

(72) Inventors: James Andrew Saxe, San Mateo, CA (US); Noah Benjamin Lang, San Francisco, CA (US); Thomas Gerardo Dignan, Mountain View, CA (US); Bradley William Null, Millbrae, CA (US)

(73) Assignee: Reputation.com, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,707

(22) Filed: Dec. 21, 2012

(51) Int. Cl.
| G06Q 30/02 | (2012.01) |
| G06Q 10/10 | (2012.01) |
| G06Q 10/06 | (2012.01) |
| G06Q 30/06 | (2012.01) |
| G06Q 10/08 | (2012.01) |
| G06Q 50/00 | (2012.01) |

(52) U.S. Cl.
CPC ..................................... *G06Q 50/01* (2013.01)
USPC .......................................... 705/1.1; 705/319

(58) Field of Classification Search
CPC ....................................................... G06Q 50/01
USPC ................................................. 705/1.1–912
See application file for complete search history.

(56) References Cited

U.S. PATENT DOCUMENTS

| 5,197,004 A | 3/1993 | Sobotka et al. |
| 6,532,459 B1 * | 3/2003 | Berson .................................. 1/1 |
| 7,191,138 B1 | 3/2007 | Roy et al. |
| 7,571,110 B2 | 8/2009 | Tarr et al. |
| 7,805,354 B2 | 9/2010 | Coleman et al. |
| 8,484,041 B2 * | 7/2013 | Yang .............................. 705/1.1 |
| 2002/0091689 A1 | 7/2002 | Wiens et al. |
| 2006/0009994 A1 | 1/2006 | Hogg et al. |
| 2006/0042483 A1 * | 3/2006 | Work et al. ..................... 101/91 |
| 2007/0027859 A1 | 2/2007 | Harney et al. |
| 2008/0109244 A1 | 5/2008 | Gupta |
| 2008/0133657 A1 * | 6/2008 | Pennington ................... 709/204 |
| 2008/0288324 A1 | 11/2008 | Graczynski et al. |
| 2009/0063248 A1 * | 3/2009 | Chong et al. .................... 705/10 |
| 2009/0076994 A1 * | 3/2009 | Ghosh et al. .................... 706/46 |
| 2009/0164311 A1 | 6/2009 | Deyo |
| 2009/0276233 A1 | 11/2009 | Brimhall et al. |
| 2011/0119225 A1 * | 5/2011 | Ghosh et al. .................... 706/52 |
| 2012/0089618 A1 | 4/2012 | Anschutz et al. |
| 2012/0226627 A1 * | 9/2012 | Yang ............................. 705/347 |
| 2013/0185189 A1 * | 7/2013 | Stewart .......................... 705/38 |

OTHER PUBLICATIONS www.Reputation.com, <www.archive.org>, Way Back Machine, Date: Oct. 10, 2011, pp. 1-5.*
www.Reputation.com, <ww.archive.org>, Way Back Machine, Date Oct. 8, 2011, pp. 1-4.
www.Reputation.com, <ww.archive.org>, Way Back Machine, Date Oct. 6, 2011, pp. 1-4.

* cited by examiner

*Primary Examiner* — Jonathan Ouellette
(74) *Attorney, Agent, or Firm* — Van Pelt, Yi & James LLP

(57) ABSTRACT

The generation of an online reputation report for an individual is disclosed. First, an online reputation assessment is performed for an individual. Then, a report is generated. The report includes an individualized recommendation based on the online reputation assessment. The recommendation can be directed to the individual and can also be directed to an entity other than the individual.

22 Claims, 7 Drawing Sheets

REPUTATION.COM | Sign Out

Please classify the following results:

1 (402)
Alice Smith — Wiki Site [www.examplewiki.com/AS.html]
Noted photographer Alice Smith has won several awards...

[ This is not me ⌄ ] (412)
☐ I control this content (430)

2 (404)
Local Woman Saves Kittens — ACME News [www.examplenews.com/kittenstory.html]
A true friend to animals, Alice Smith (pictured below) has personally helped find homes for over 200 kittens this year...

[ Positive ⌄ ] (414)
☐ I control this content

3 (406)
Alice Q. Smith — Phone Stalker [www.examplephonesite.com]
Are you looking for Alice Q. Smith's phone number? We have it! Her number is: 555-555-1212.

[ Private Info Exposed ⌄ ] (416)
☐ I control this content

REPUTATION.COM

Sign Out

RANK | RESULT | RECOMMENDATION
--- | --- | ---
9 | My New Kitten Rescue Charity -- January 1 [www.aliceblogsite.com/kittenrescue.html] — 602<br>I had a truly remarkable day today. As I was walking down the street, I looked up and saw a cat in a tree... — 608 | POSITIVE RESULT — 604<br>This document has a positive effect on your reputation, and it's a site you control. Regular maintenance of this source will guarantee you don't lose this premium spot.
10 | Alice Smith was a Bad Girlfriend [www.joesexeswebpage.com/Alice.html]<br>Alice and I were together for two years. She never bought me good birthday presents and she was always rude to my friends... | NEGATIVE RESULT — 610<br>Write more content on your blog or use ReputationDefender to demote this result. Its prominence may harm your reputation.
... | |

FIG. 6

REPUTATION REPORT WITH RECOMMENDATION

BACKGROUND OF THE INVENTION

Increasingly, when a first person chooses to learn more about a second person, the first person will perform an online search with respect to the second person. Unfortunately, the search results may be inaccurate or provide an incomplete picture of the second person. The first person may make important and potentially erroneous decisions about the second person based on the search results.

BRIEF DESCRIPTION OF THE DRAWINGS

Various embodiments of the invention are disclosed in the following detailed description and the accompanying drawings.

FIG. 4 illustrates an embodiment of an interface for coding documents.

FIG. 6 illustrates a portion of a reputation report.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
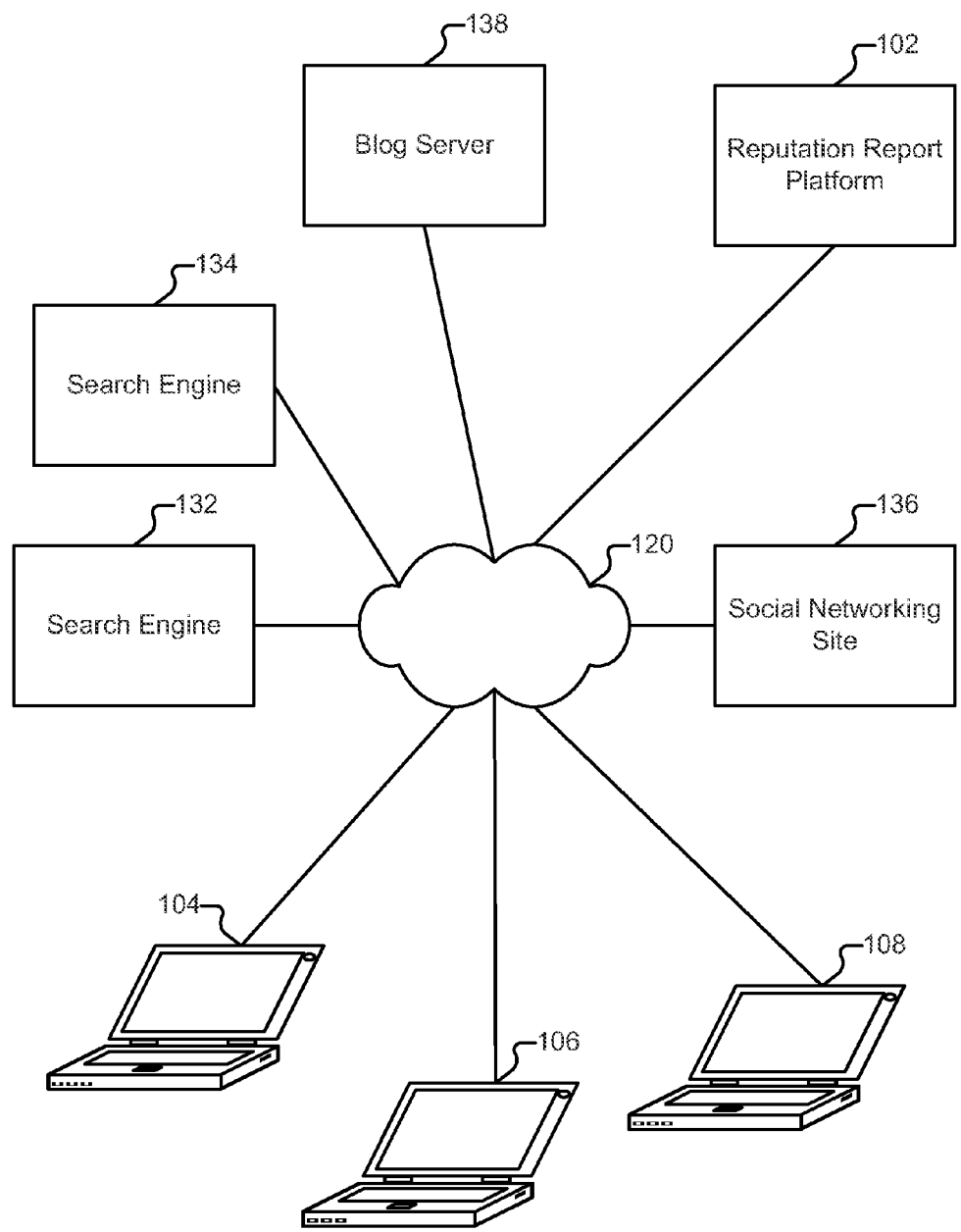
FIG. 1 illustrates an embodiment of an environment in which reputation reports are provided.

FIG. 1 illustrates an embodiment of an environment in which reputation reports are provided. In the example shown, the user of client device 104 (hereinafter referred to as "Alice") and the user of client device 106 (hereinafter referred to as "Bob") each interact with reputation report platform 102 (via network 120) to create and obtain reports that help them assess their online reputations. Further, if authorized by Bob, the user of client device 108 (hereinafter referred to as "Charlie") can view Bob's reputation report, or portions thereof. As will be described in more detail below, an individual's reputation report can include recommendations for improving the individual's reputation, and can also include one or more reputation scores.

Reputation report platform 102 is configured to obtain data pertaining to Alice and Bob from a variety of sources. As shown, such sources include search engines 132-134, blog server 138, and social networking site 136, other sources can also be used, such as news sites, people search sites. Data can include text (in various formats) as well as image or other applicable types of information. Reputation report platform 102 can obtain the data from sources 132-138 in a variety of ways, including by scraping publicly available information, by using one or more Application Programming Interfaces (APIs), and/or by using authorization/credentials provided by individuals such as Alice and Bob. As one example of the latter case, Bob may have an account on social networking site 136 but have privacy settings on his profile that limit the profile's visibility to the public. Bob can provide credentials or other authorization to reputation report platform 102 so that platform 102 can access Bob's profile, and also, potentially, view other information on site 136 that would be visible to Bob when logged into the site but not otherwise visible to platform 102.

Figure 2:
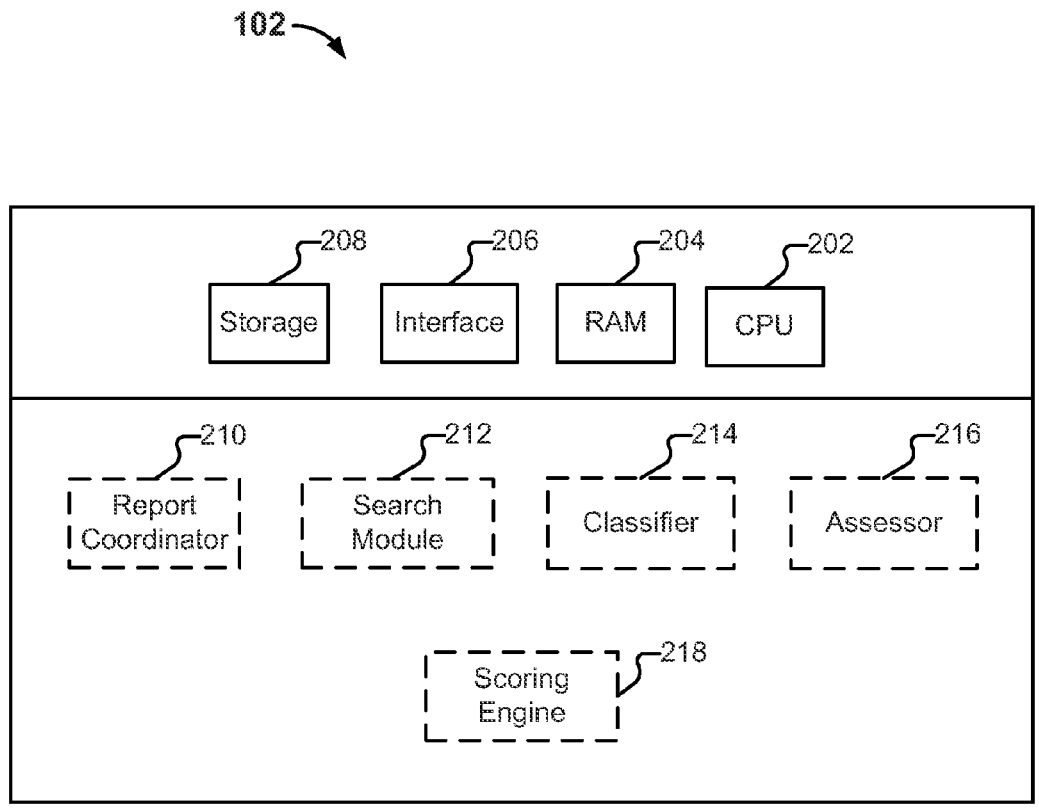
FIG. 2 illustrates an embodiment of a reputation report platform.

FIG. 2 illustrates an embodiment of a reputation report platform. In the example shown in FIG. 2, platform 102 comprises standard commercially available server hardware (e.g., having a multi-core processor 202, 8G+ of RAM 204, gigabit network interface adaptor(s) 206, and hard drive(s) 208) running a typical server-class operating system (e.g., Linux). In various embodiments, platform 102 is implemented across a scalable infrastructure comprising multiple such servers, solid state drives, and/or other applicable high-performance hardware. Whenever platform 102 is described as performing a task, either a single component or a subset of components or all components of platform 102 may cooperate to perform the task. Similarly, whenever a component of platform 102 is described as performing a task, a subcomponent may perform the task and/or the component may perform the task in conjunction with other components. In various embodiments, portions of platform 102 are provided by one or more separate devices, including devices provided by third parties.

Generating a Reputation Report

Figure 3:
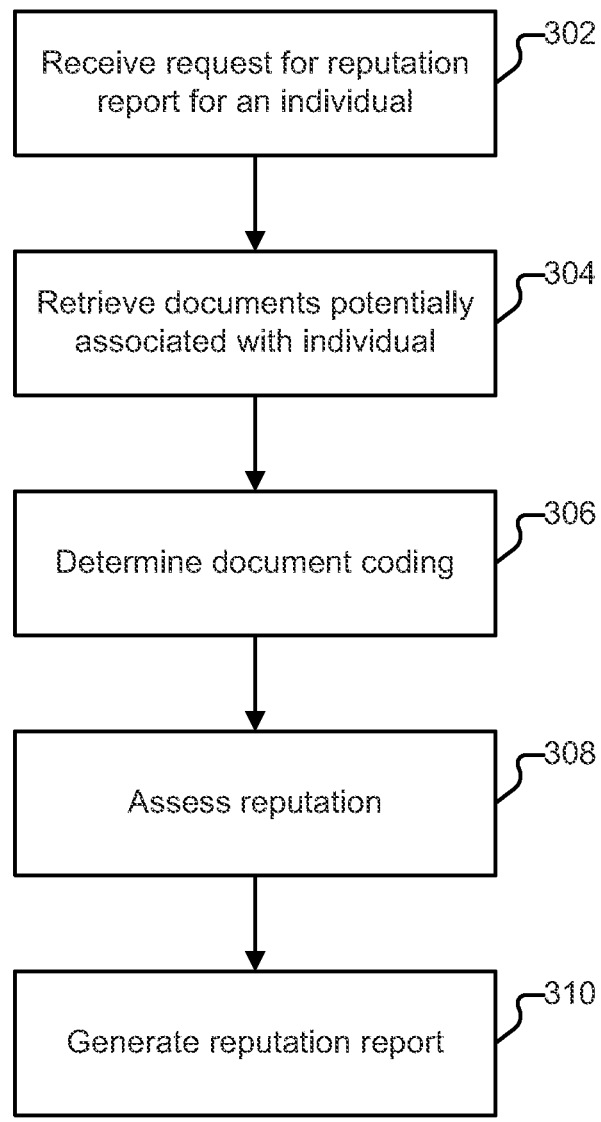
FIG. 3 illustrates an example of a process for generating a reputation report.

FIG. 3 illustrates an example of a process for generating a reputation report. In some embodiments, process 300 is performed by reputation report platform 102. The process begins at 302 when a request for a reputation report for an individual is received. As one example, suppose Alice visits platform 102 by directing a web browser on client device 104 to a web interface provided by platform 102. Through the interface, Alice instructs platform 102 that she would like to obtain an online reputation report (e.g., by selecting an appropriate option from a menu). Alice's request is received at 302 by report coordinator 210. In some embodiments, a request is received at 302 via a third party. For example, instead of directly interacting with the interface, a representative of platform 102 could interact with the interface on Alice's behalf (e.g., during a phone call or chat session with Alice).

At 304, documents potentially associated with the individual whose reputation report has been requested are retrieved. As one example, after receiving Alice's request at 302, report coordinator 210 instructs search module 212 to perform a search via search engine 132 for documents pertaining to Alice (e.g., by instructing search module 212 to perform a search for "Alice Smith"). In some embodiments, prior to the commencement of process 300, Alice has registered for an account on platform 102 and has filled out profile information (e.g., listing her full name as "Alice Smith.") In other embodiments, process 300 commences when Alice types her full name into an interface provided by platform 102, irrespective of whether Alice has signed up for an account.

The results returned by search engine 132 are an example of documents retrieved at 302. Portion 304 of the process can be performed in a variety of manners, and can be performed before and/or after the processing performed at 302. For example, in some embodiments search module 212 queries multiple sources (e.g. search engines 132 and 134) regarding Alice. Search module 212 can also be configured to query different types of sources (e.g. search engines and social networking sites). Search results can be obtained and stored (e.g., in storage 208), in which case at least some documents retrieved at 304 are retrieved from storage 208 rather than a service such as search engine 132.

At 306, a set of codings for at least some of the documents retrieved at 304 is performed. In some embodiments, Alice is asked to code at least some of the documents. An interface for performing the coding is shown in FIG. 4. As will be explained in more detail below, examples of codings include "this document does not pertain to me," and "this is negative information about me." In some embodiments, a default coding of "neutral" is employed. Also as will be explained in more detail below, the codings can be multi-dimensional. For example, a newspaper article describing Alice's volunteer work at a local animal shelter can be coded as a "positive" document from a "trustworthy" source, while a social networking rant by a former boyfriend can be coded as a "negative" document pertaining to her "romantic life." Also, as explained above, a third party can use the interface shown in FIG. 4 on Alice's behalf.

In some embodiments, the documents are at least partially coded by platform 102. For example, a classifier 214 can be employed to determine a preliminary coding of at least some of the documents, and Alice can optionally be asked to confirm or adjust the preliminary coding. As one example, classifier 214 can use sentiment analysis techniques to determine whether a document is positive or negative. As another example, classifier 214 can be configured to use the domain from which a result is retrieved to impute a coding. For example, classifier 214 can be configured with a list of "positive" sites and "negative" sites, such that if an individual's name appears on a charitable organization's page (i.e. "positive") the result can be automatically coded as positive and if it appears on a sex-offender registry site (i.e. "negative") the result can be automatically coded as negative. As yet another example, classifier 214 can be configured to automatically code domains as "trustworthy" or not (or neutral) based on a predefined list, or based on other information, such as a site's Page Rank. As yet another example, classifier 214 can be configured to automatically code results as "credible" or not based on their age. For example, an article that has been available online for a long period of time can be treated as more credible than one that was recently added. Classifier 214's coding can also be used without confirmation from Alice. As another example, platform 102 can be configured to use a service such as Amazon's Mechanical Turk to perform coding and/or preliminary coding.

Figure 5:
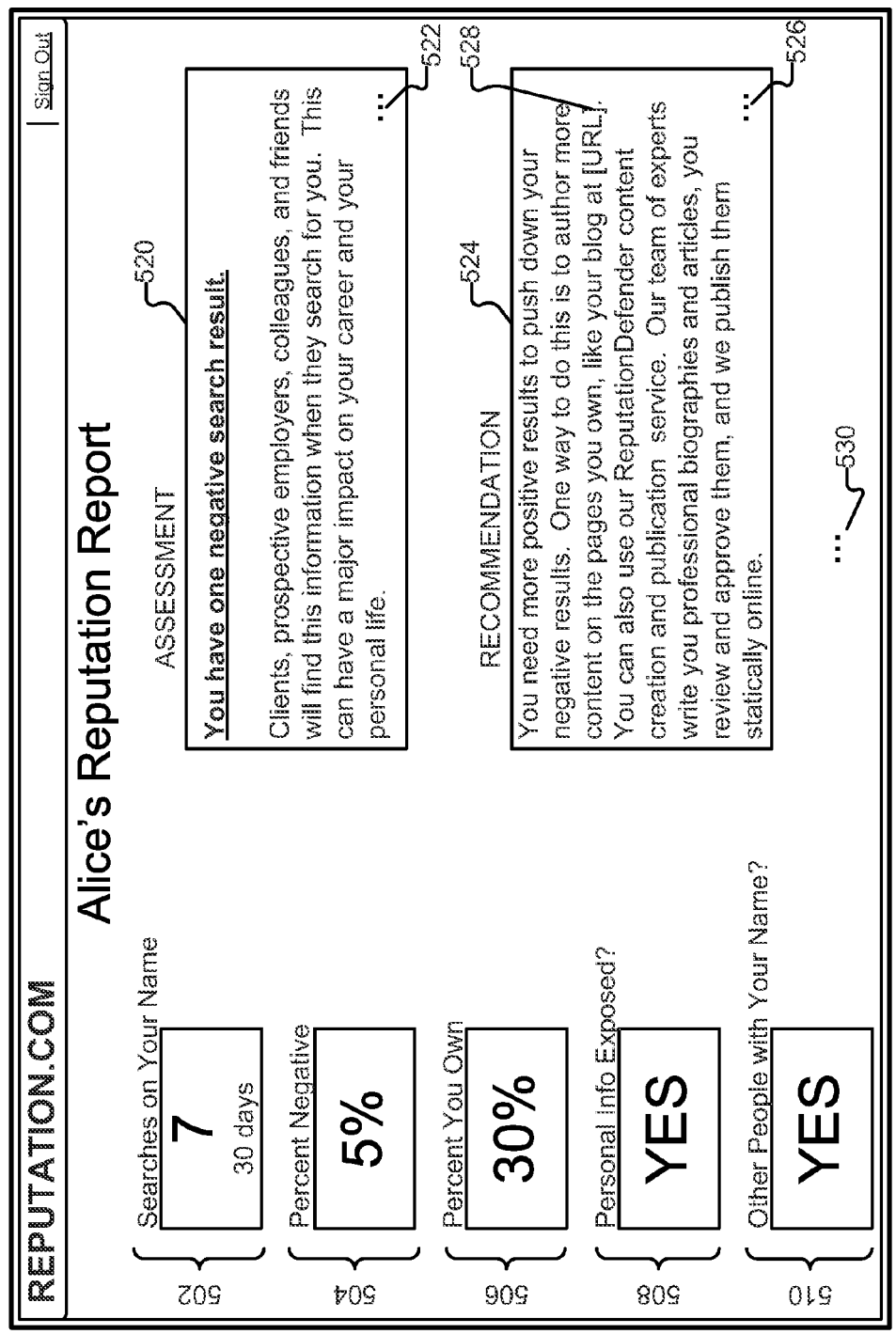
FIG. 5 illustrates an embodiment of a reputation report.

At 308, a reputation assessment is made by assessor 216 based at least in part on the coded documents, and at 310, a report is generated. An example of a reputation report is shown in FIG. 5. In some embodiments, the report includes recommendations, such as recommendations for improving one's online reputation. The report can also include one or more reputation scores, discussed in more detail below.

FIG. 4 illustrates an embodiment of an interface for coding documents. In some embodiments, interface 400 is shown to an individual requesting a reputation report, as part of a report generation process. For example, interface 400 is shown to Alice in conjunction with portion 306 of process 300. Specifically, the top results of a search performed by search module 212 are presented to Alice, and she is asked to code those results. The top results (i.e., the ones returned first by a search engine) are the ones most likely to be viewed by other individuals trying to find out more about Alice, and therefore particularly important to her online reputation.

The first result (402) is about a different Alice Smith, so Alice selects "This is not me" from dropdown 412. Name confusion can cause the reputations of others (i.e., other Alice Smiths) to impact Alice's reputation. The second result (404) is a positive news article about Alice, so she selects "Positive" from dropdown 414. The third result (406) is a third party website page that reveals Alice's telephone number, so she selects "Private Info Exposed" from dropdown 416. Other examples of labels Alice can use to code documents include "Negative" (indicating that the document says harmful things about Alice) and "Worth Monitoring" (indicating that the document is worth monitoring to make sure it does not become an issue in the future). Also included for each result presented in interface 400 is a checkbox (e.g. 430) that allows Alice to indicate whether she controls the content. For example, if a result displayed in interface 400 is from Alice's personal blog (e.g. hosted on server 138) or her profile on a social networking site (e.g., site 136), Alice would check the checkbox adjacent to that result. If the result displayed was authored by someone else (e.g. appearing in a newspaper), Alice would not check the checkbox. In some embodiments, whether or not Alice controls a result is determined by platform 102. For example, if the result is Alice's profile on a social networking site, platform 102 can automatically conclude that Alice is able to modify the result.

As mentioned above, in some embodiments, platform 102 supports multi-dimensional coding. Using result 404 as an example, an example of a multi-dimensional coding is "Positive" and "Trustworthy." The second dimension (trustworthy) indicates that the source—a newspaper—is considered a trustworthy source of information. As a contrasting example, a blog page set up under a pseudonym on a free site might be coded as "Untrustworthy." Other examples of second dimensions (i.e., combined with "Positive" or "Negative" to form multi-dimensional codings) include topical/biographical areas, such as "Health," "Romantic Relationships," "Ethics," "Competence," and "Finance." An article praising a surgeon's good outcomes could be coded as "Positive—Competence" and a blog post ridiculing an individual for losing a large sum of money in Las Vegas could be coded as "Negative—Finance."

As Alice scrolls down the page presented in interface 400, she will be presented with additional results to code. For example, the top 20 results returned by search engine 132 are presented in interface 400. In some embodiments, if Alice codes more than a threshold number of results as not pertaining to her (412) additional results are shown (i.e. the next 20 results) and she is asked to code those as well. As needed, results from other sources can also be presented to ensure that a sufficient number of results pertaining to Alice have been coded. For example, the top 20 results from search engine 132 are presented, followed by the top 10 results from search engine 134, and any results found on server 138 or site 136.

FIG. 5 illustrates an embodiment of a reputation report. In some embodiments, a report such as report 500 is generated at portion 310 of process 300. As shown, report 500 is rendered in a browser. Report 500 can also be provided in other forms, such as by being emailed to Alice as a PDF document. In region 502 of the report, the number of times Alice's name has been searched for in a month (e.g., in search engine 132, or across multiple sites, as applicable) is presented. According to report 500, "Alice Smith" has been searched for seven times in the last month. This can help indicate to Alice how important her online reputation is (i.e., the more people performing searches for "Alice Smith," the more people will be exposed to the results and form opinions about Alice based on the results.) The data included in region 502 may be obtainable directly from/in cooperation with sites such as site 132, and can also be computed/extracted as needed where the sites do not expose the information. For example, suppose as a seller of advertisements, search engine 132 makes available an interface that potential advertisers can use to see how often a given search time is used. That interface can be used by platform 102 to determine how many times "Alice Smith" has been searched for in a given time period.

In region 504 of the report, the percentage of results (e.g. the top 20 results reviewed by Alice in interface 400) that are negative/harmful is displayed. According to report 500, 5% of the top results for "Alice Smith" are negative.

In region 506 of the report, the percentage of results (e.g., the top 20 results reviewed by Alice in interface 400) that are controllable/editable by Alice are shown. According to report 500, 30% of the top results for "Alice Smith" are pages such as blog posts written by Alice, Alice's profile on social networking site 136, and/or other places where Alice can modify what appears there.

In region 508, Alice is alerted that personal information about her is exposed. In example report 500, region 508 shows either a "yes" or a "no." Alice's report includes a "yes" in this region because her phone number is publicly available on a people search site. In other embodiments, region 508 displays other information, such as by explicitly stating which information is exposed (e.g., phone number, birthday, home address) and/or the number of sites that expose her information.

In region 510, Alice is alerted that at least some of the results in the top 20 results for "Alice Smith" are not about her, but are about at least one other individual named Alice Smith. As with region 508, the information presented in region 510 can take a variety of forms. For example, in some embodiments region 510 indicates the percentage of pages about Alice vs. other people sharing her name.

Region 520 of report 500 includes an assessment of Alice's reputation. In particular, it highlights to her that one of the results in the top 20 results is negative and explains why that is problematic. Additional assessment information (e.g., warning her about the exposure of her personal information) is available to Alice by clicking on region 522.

Region 524 of report 500 includes individualized recommendations for how Alice can improve her online reputation, based on an analysis of the top results. In particular, Alice owns (i.e., can edit) a fair amount of the top results. A recommendation is made to Alice that she can push the one negative result lower (i.e. from appearing in the top 20 results to a lower position) by authoring more content, such as more blog posts on her blog (528) or by signing up for professional services. If a result is coded as negative, and also is coded as being controllable/editable by Alice, a recommendation would be made that Alice edit/otherwise remove the negative material, since she has the ability to do so.

FIG. 6 illustrates a portion of a reputation report. In addition to the summary information presented in report 500, details regarding each of the top results can be shown to Alice. For example, Alice can be shown the information presented in FIG. 6 when she scrolls down (530) in report 500 (or, where the report is a document, such as a PDF, as she flips through the pages). For each of the top results, a recommendation associated with the result is displayed. For example, result 9 (602) is a positive result, and a recommendation (604) is made to Alice to maintain the source. As another example, result 10 (608) is a harmful result, and a recommendation (610) is made to Alice that she should bury the result by authoring more content (or having it authored on her behalf).

Additional Examples of Assessments and Recommendations

The following are additional examples of assessments that can be made about an individual's online reputation, and examples of recommended actions those individuals can take.

Example 1

Individual has at Least One Negative Result in the Top 20

ASSESSMENT: You have negative content in the search results seen by 99% of people who look for you online. According to ACME Interactive, 3 out of 4 individuals would refuse to interact with a person after finding negative information about them online.

RECOMMENDATION: You have a highly-rated blog. Write more posts or hire us to bury the negative content using ReputationDefender: our experts strategically create professional content for you, you review and approve our writing, and we promote this material online using our technologies. Positive content goes up and negative content goes down.

Example 2

Individual has Private Information Exposed

ASSESSMENT: Your personal information is easily accessible through people-search sites. This type of personal data can be used by identity thieves and stalkers to hurt you and your family. Identity theft costs American consumers $37 billion every year (ACME Research). The personal data can also be used, unfairly, by those looking to employ, date, or do business with you (e.g., to make decisions based on what part of town you live in or your age).

RECOMMENDATION: Request that your information be removed from the following sites. We can simplify the safeguarding of your personal information using our one-click MyPrivacy program. We automatically remove your personal information from the top people-search sites and prevent them from re-adding you again in the future. We also block Web tracking, telemarketers, and unsolicited postal mail.

Example 3

Many of the Results are for a Person that is not the Individual

ASSESSMENT: Your search results include a lot of information about somebody else. People could think these results are about you, giving them a bad impression. According to ACME Interactive, 3 out of 4 individuals would refuse to interact with a person after finding negative information about them online.

RECOMMENDATION: You need there to be more results about you in the top results for your name. Create more of your own content, or have us help you bury the misleading items using ReputationDefender: our experts strategically create professional content for you, you review and approve our writing, and we promote this material online using our technologies. Quality items go up and misleading content goes down.

Example 4

Individual has Few Positive Results

ASSESSMENT: You have a limited online presence and are vulnerable to misrepresentation. Search results can change overnight, and surveys show that 3 out of 4 individuals would refuse to interact with a person after finding negative information about them online (ACME Interactive).

RECOMMENDATION: Expand your online presence by authoring more content, such as by starting a blog or signing up for social networking sites. You can also use ReputationDefender: our experts strategically create professional content for you, you review and approve our writing, and we promote this material online using our technologies. Quality items go up and any misleading content goes down.

Example 5

Individual has Many Positive Results

ASSESSMENT: Congratulations, you currently have a strong online presence. However, search results can change overnight, and surveys show that 3 out of 4 individuals would refuse to interact with a person after finding negative information about them online (ACME Interactive). Make sure to invest into upkeep for your online reputation.

RECOMMENDATION: Allow us to monitor your results. If we notice a significant change in your online reputation, we'll contact you immediately and help correct the situation.

Example 6

Individual has Both Negative Content and Privacy Issues

ASSESSMENT: You have negative content in your search results, as well as people-search sites that make you vulnerable to identity theft. Three out of four individuals would refuse to interact with a person after finding negative information about them online (ACME Interactive), and identity theft costs American consumers $37 billion every year (ACME Research).

RECOMMENDATION: Bury the negative content by writing more blog posts, or by using our ReputationDefender technology; safeguard your personal information by opting out of people-search sites. We can make it easy with our one-click MyPrivacy program.

Reputation Scoring

In some embodiments, reputation report platform 102 includes a scoring engine 218 configured to generate one or more reputation scores. As one example, a general reputation score (e.g. "85/100") can be determined for Alice by assigning scores to each of the values appearing in regions 502-510 and summing, multiplying, or otherwise aggregating the results. The five factors can be weighted differently, e.g. with "Percent Negative" being given more weight than "Searches on Your Name." The score can be saved (e.g., in storage 208), periodically recomputed, and used to help an individual such as Alice understand how her reputation has changed over time, and what factors contribute most to how she is likely to be perceived by someone trying to find out more about her online.

Reputation scores can be included in a report, such as reputation report 500, and can also be provided by themselves, without any additional information (and, for example, without a recommendation), omitting or modifying portion 310 of the process shown in FIG. 3. In some embodiments, instead of a specific value (e.g., 85% or 85/100), a threshold value is applied, and a person having a reputation above the threshold is acknowledged by platform 102 as being considered "reputable," while someone with a score not meeting the threshold will not receive such an acknowledgment. Further, multiple types of reputation scores can be computed, e.g., pertaining to different aspects of an individual's reputation. As one example, where multi-dimensional coding is used (e.g., at 306), a subset of coded documents can be used in the analysis performed (e.g., at 308) rather than the entire set. For example, only those results coded (whether positive, negative, or neutral) pertaining to a person's professional competence, or to the person's romantic life, can be used.

In the following example, suppose that Bob would like to conduct business with Charlie. In particular, Bob would like to sell his car to Charlie, whom he met by placing a "for sale" advertisement on an online classified advertisement site. Charlie would like assurance that Bob is a reputable individual. Embodiments of reputation report platform 102 can be used in a variety of ways, both by Bob, and by Charlie, to help Charlie feel more comfortable about transacting with Bob.

As explained above, in some embodiments, platform 102 is configured to receive credentials (or other access authorization) from an individual such as Bob, with respect to a variety of services. For example, Bob can provide to platform 102 his credentials for social networking site 136, allowing platform 102 to access (304) and analyze (306, 308) any private posts made by or about Bob. In this scenario, all posts will be applicable to Bob (and not, for example, someone else sharing his name), so Bob will not need to code the results as belonging to him or not. Further, classifier 214 can perform sentiment analysis on the posts, and Bob need not code the documents (e.g., as positive or negative) himself. Not enlisting Bob's assistance in coding documents can be done, both as a convenience to Bob, and also (e.g., where Bob shares information collected by platform 102 with others, such as Charlie) to help ensure that Bob does not attempt to game or otherwise tamper with his reputation information.

As another example, Bob could provide his credentials for an online auction site to demonstrate his ownership of a particular account on the auction site having particular feedback. Any credentials provided by Bob, and any information scraped from site 136 or the auction site can be stored in storage 208 as applicable. The documents pertaining to Bob can be used to generate a score that is sharable with Charlie in a variety of ways. As one example, Bob could provide Charlie's email address to platform 102 and platform 102 could email Charlie Bob's reputation score. As another example, Bob could instruct platform 102 to make available his score to Charlie for a limited amount of time (e.g. via a web interface).

In various embodiments, some, but not all aspects of Bob's reputation are considered by platform 102 when performing analysis (and scoring) and/or made available to Charlie. For example, suppose Bob has an account on a dating website and has been subject to negative feedback from several of his dates due to his appearance. If Bob's entire reputation was assessed by platform 102 to determine a single reputation score, Bob's score might appear quite low due to the negative dating reviews. However, Bob's reputation as a prospective date likely has very little bearing on whether or not he is sufficiently reputable to sell a car to Charlie. Indeed, other aspects of Bob's reputation (e.g., determined from blog posts, news articles, data from professional networking sites, and online auction sites) might be very positive and much more probative. A report, for a particular purpose (e.g., "transact business with" vs. "date") can be generated by platform 102 accordingly, by including or excluding certain documents from analysis based on their coding.

Additional examples of reputation assessments for specific purposes, including reputation for employment, renting real estate, loan/financing, credit-worthiness, and admitting to school (e.g., each of which might exclude romantic reputation information but include all other aspects). A further example includes pet adoption (e.g., excluding job/other professional information, but including reputation information indicative of good character/kindness).

Figure 7:
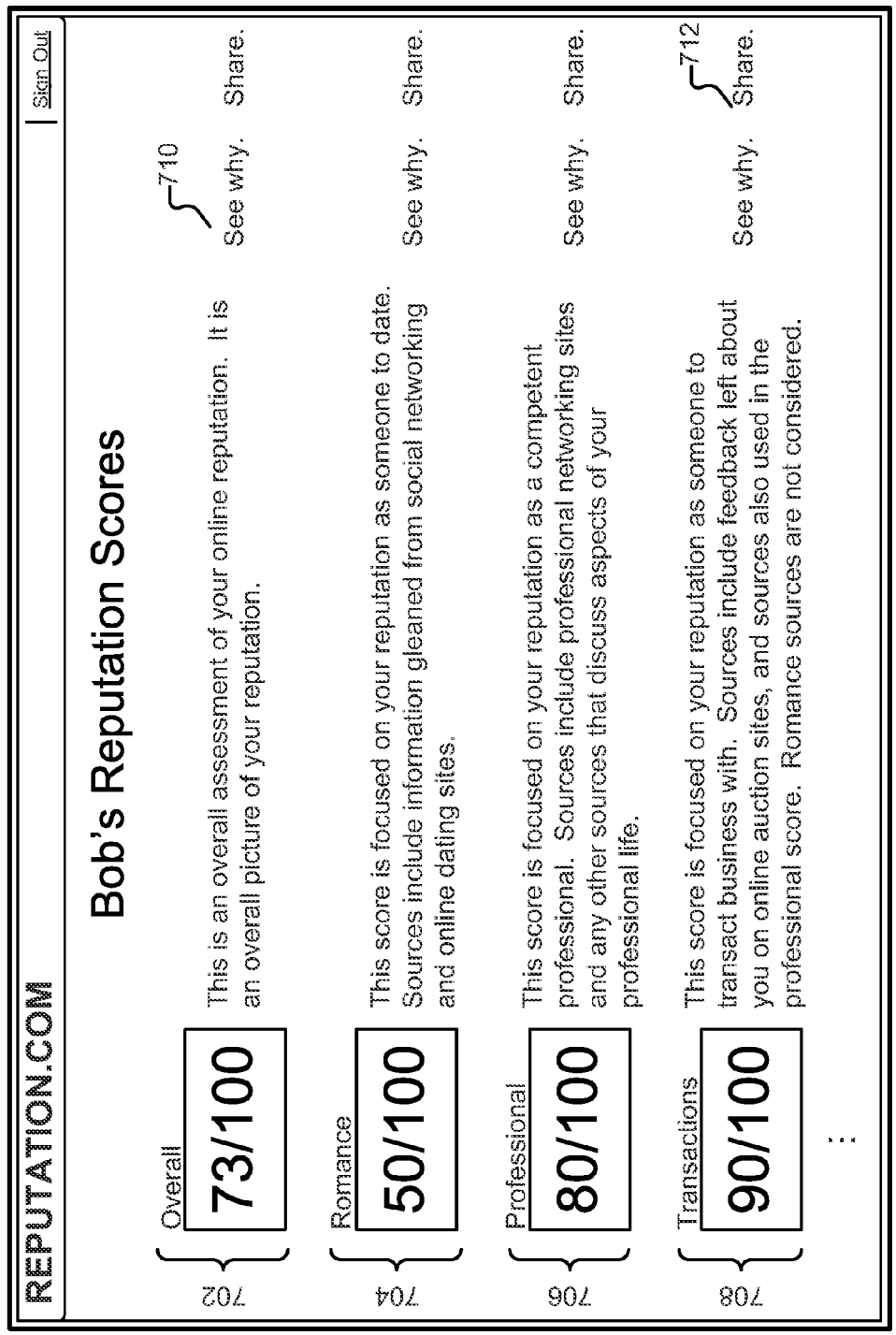
FIG. 7 illustrates a portion of a reputation report.

An example of a reputation report that includes a variety of scores is depicted in FIG. 7. In particular, FIG. 7 includes an overall score for Bob (702), as well as scores that focus on his reputation with respect to various aspects of his life (704-708). Bob can learn how each of the scores was determined (and, e.g. the top positive and negative documents contributing to each) by clicking on a "See why" link (e.g., link 710). In some embodiments, if Bob clicks on link 710, he will be shown content similar to that depicted in FIG. 6 (i.e., listing individual results and providing recommendations pertinent to the results).

In some embodiments, Bob can provide the output generated by platform 102 (e.g. a report similar to report 500 and/or one or more scores) to a prospective employer (or other entity interested in Bob's reputation), allowing the employer to verify that Bob is an upstanding member of society (including on social networks) without requiring Bob to divulge his credentials to the prospective employer or otherwise compromise his privacy. For example, suppose Bob clicks a "Share" link (e.g., link 712) in the interface shown in FIG. 7. In response, platform 102 can ask Bob a series of questions, such as who he would like to share the information with, at what level of detail, and in what manner. As one example, Bob could ask platform 102 to mail score 708 to Charlie. As another example, Bob could obtain from platform 102 a temporary link to give to Charlie, that will allow Charlie to view Bob's score 708 for a limited period of time (e.g., one viewing, one day, or one week). As yet another example, Bob could request platform 102 to generate a report (e.g. as a PDF) and mail it to Charlie.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
perform an online reputation assessment of an individual, wherein performing the online reputation assessment includes performing a search associated with the individual and receiving as results one or more documents potentially associated with the individual; and
generate as output, a reputation report that includes an individualized recommendation based on the online reputation assessment, wherein the individualized recommendation comprises a set of one or more recommended actions to take on behalf of the individual, and wherein the individualized recommendation is determined at least in part based on the presence of a document having a first classification in the results; and
a memory coupled to the processor and configured to provide the processor with instructions.

2. The system of claim 1 wherein performing an online reputation assessment includes receiving a coding of at least some returned search results.

3. The system of claim 2 wherein a first result included in the returned search results is coded as revealing private information of the individual.

4. The system of claim 2 wherein a first result included in the returned search results is coded as positive result.

5. The system of claim 2 wherein a first result included in the returned search results is coded as a negative result.

6. The system of claim 2 wherein a first result included in the returned search results is coded as not pertaining to the individual.

7. The system of claim 2 wherein a first result included in the returned search results is coded as a document to be monitored.

8. The system of claim 2 wherein a first result included in the returned search results is coded as a document under the control of the individual.

9. The system of claim 2 wherein a first result included in the returned search results is coded in at least two dimensions.

10. The system of claim 9 wherein a first dimension indicates whether the result expresses positive or negative sentiment and wherein a second dimension indicates whether the source of the result is trustworthy or untrustworthy.

11. The system of claim 9 wherein a first dimension indicates whether the result expresses positive or negative sentiment and wherein a second dimension indicates a topical categorization of the result.

12. The system of claim 11 wherein the topical categorization comprises at least one of a financial categorization, a relationship categorization, and a legal categorization.

13. The system of claim 2 wherein the coding is received at least in part from the individual.

14. The system of claim 2 wherein the coding is received at least in part from a classification engine.

15. The system of claim 2 wherein the coding is received in response to a user interaction with a preliminary coding performed by a classification engine.

16. The system of claim 1 wherein the recommendation includes a recommendation to safeguard the private information.

17. The system of claim 1 wherein the recommendation includes a recommendation to repeat the assessment after a specified amount of time.

18. The system of claim 1 wherein the recommendation includes a recommendation to push a negative result lower.

19. The system of claim 1 wherein the reputation assessment includes a reputation score.

20. The system of claim 1 wherein the individualized recommendation is directed to an entity other than the individual.

21. A method, comprising:
performing an online reputation assessment of an individual, wherein performing the online reputation assessment includes performing a search associated with the individual and receiving as results one or more documents potentially associated with the individual; and
generating as output, using a processor, a reputation report that includes an individualized recommendation based on the online reputation assessment, wherein the individualized recommendation comprises a set of one or more recommended actions to take on behalf of the individual, and wherein the recommendation is determined at least in part based on the presence of a document having a first classification in the results.

22. A system, comprising:
a processor configured to:
perform an online reputation assessment of an individual, wherein performing the online reputation assessment of the individual includes determining whether search results indicate that private information associated with the individual is publicly available; and
generate as output, a reputation report that includes an individualized recommendation based on the online reputation assessment; and
a memory coupled to the processor and configured to provide the processor with instructions.

\* \* \* \* \*